US009137557B1

(12) United States Patent
Sandoval et al.

(10) Patent No.: US 9,137,557 B1
(45) Date of Patent: Sep. 15, 2015

(54) SYSTEMS AND METHODS FOR IMPLEMENTING A DYNAMIC AND/OR INTERACTIVE MEDIA CAMPAIGN

(75) Inventors: Francis R. Sandoval, Louisville, CO (US); Steven Ernest Riedl, Superior, CO (US); Walter F. Michel, Glenside, PA (US)

(73) Assignees: TIME WARNER CABLE INC., New York, NY (US); CABLE TELEVISION LABORATORIES, INC., Louisville, CO (US); COMCAST CABLE COMMUNICATIONS, LLC, Philadelphia, PA (US)

( * ) Notice: Subject to any disclaimer, the term of this patent is extended or adjusted under 35 U.S.C. 154(b) by 609 days.

(21) Appl. No.: 12/533,431

(22) Filed: Jul. 31, 2009

Related U.S. Application Data

(60) Provisional application No. 61/091,147, filed on Aug. 22, 2008.

(51) Int. Cl.

| | |
|---|---|
| *H04N 7/10* | (2006.01) |
| *H04N 7/025* | (2006.01) |
| *H04N 21/258* | (2011.01) |
| *H04N 21/81* | (2011.01) |

(52) U.S. Cl.
CPC ....... *H04N 21/25883* (2013.01); *H04N 21/812* (2013.01)

(58) Field of Classification Search
CPC ....................... H04N 21/25883; H04N 21/812
USPC ................................... 725/13, 22, 24, 32–36
See application file for complete search history.

(56) References Cited

U.S. PATENT DOCUMENTS

| | | | | |
|---|---|---|---|---|
| 4,507,680 | A * | 3/1985 | Freeman | 725/139 |
| 6,169,542 | B1 * | 1/2001 | Hooks et al. | 715/719 |
| 6,698,020 | B1 * | 2/2004 | Zigmond et al. | 725/34 |
| 7,729,940 | B2 * | 6/2010 | Harvey et al. | 705/7.31 |
| 2002/0083444 | A1 * | 6/2002 | Blasko et al. | 725/35 |

* cited by examiner

*Primary Examiner* — Dominic D Saltarelli
(74) *Attorney, Agent, or Firm* — Fitzpatrick, Cella, Harper & Scinto

(57) ABSTRACT

Systems and methods for implementing a dynamic broadcast campaign and/or an interactive broadcast campaign are provided, in which an interactive program is broadcast to an audience and in which members of the audience may interact with media content of the interactive program and/or in which a dynamic program is broadcast to a segment of the audience. The systems and methods utilize a platform that facilitates the creation, execution, and monitoring of a dynamic broadcast campaign and/or an interactive broadcast campaign, as well as one or more interactive and/or dynamic programs within the campaign. Each interactive program enables audience members to interact or send messages to the program, such that the messages are received and processed by the program itself or received by the program and processed by the broadcaster that aired the program.

46 Claims, 8 Drawing Sheets

SYSTEMS AND METHODS FOR IMPLEMENTING A DYNAMIC AND/OR INTERACTIVE MEDIA CAMPAIGN

CROSS REFERENCE TO RELATED APPLICATION

The present application claims the benefit of U.S. Provisional Application No. 61/091,147, filed Aug. 22, 2008, the entire disclosure of which is incorporated by reference herein.

BACKGROUND OF THE INVENTION

1. Field of the Invention

The present invention relates generally to systems and methods for implementing a media campaign for delivering a multi-part set of media programs to an audience. More particularly, the present invention relates to systems and methods for implementing an interactive media campaign, in which an interactive program or media content is delivered to an audience such that members of the audience may interact with the media content to provide input that is received and processed as part of the interactive media campaign, as well as systems and methods for implementing a dynamic media campaign, in which different dynamic programs or media contents may be delivered or addressed to particular segments of the audience, and in which the media contents delivered to the particular segments of the audience may be changed during the course of the dynamic media campaign. That is, a campaign may be dynamic in the sense that updates to dynamic programs or media contents of the campaign may be communicated and implemented during the execution of the campaign; and a campaign may be interactive in the sense that an audience member may interact or provide input to an interactive program while viewing or experiencing the program, such that the input is received and processed by the campaign owner and/or another party responsible for providing the interactive program to the audience member. A dynamic program may also be an interactive program. In an aspect of the present invention, the execution of a campaign is comprehensively measured during the course of the campaign to obtain service measurement data, which may be used to optimize the current campaign or future campaigns. The service measurement data is collected and reported to the campaign's owner, for example, so that the data can be used to monetize the campaign by demonstrating its successful execution and its reach and response rates. The data also provides a means for forecasting the success of future campaigns, and serves as a basis for any number of analyses on viewership trends/characteristics of campaigns.

2. Related Art

Presently, there are several known ways to provide media contents to an audience. For radio programs, analog AM and FM signal-transmission technologies are well known and in popular use, and digital signal-transmission technologies have advanced to the point that the popularity of digital radios has increased notably in the last decade. For television programs, analog signal-transmission technologies, cable transmission technologies, and satellite transmission technologies are well known and in popular use.

A common characteristic of the above-mentioned media technologies is that the media programs are intended to be experienced by a general audience and a passive audience. That is, a single program is broadcast for all members of the audience to experience (i.e., watch and/or listen to). Therefore, the above-mentioned media technologies do not make accommodations for the diverse backgrounds, diverse tastes, and diverse interests of the general audience. Moreover, the above-mentioned media technologies do not allow for members of the audience to interact with the program while it is being broadcast.

BRIEF DESCRIPTION OF EMBODIMENTS OF THE INVENTION

Given the foregoing, what is needed are systems and methods for facilitating the implementation of an interactive broadcast campaign, in which audience members (also referred to herein as "viewers" or "subscribers") can interact with media content contained in an interactive program of the campaign, and in which the interactive broadcast campaign can include different interactive programs broadcast to different segments of the audience members, respectively.

As used herein, the term "broadcast" is used generally to describe delivery of media contents to an audience by any type of transport mechanism, including via cable technologies, via Web-based technologies, via satellite technologies, via video-on-demand (or VOD) technologies, via traditional radio-wave technologies, via digital video recorder (or DVR) type technologies, and the like. As such, broadcasting of media contents includes delivery of the media contents to individual viewers (e.g., in the case of VOD technologies) as well as broad delivery to a general audience (e.g., in the case of traditional radio-wave technologies).

The above-identified needs are met by providing a platform for facilitating the creation, execution, and monitoring of a dynamic broadcast campaign with dynamic programs or media contents, an interactive broadcast campaign with one or more interactive programs or media contents, or a dynamic and interactive broadcast campaign. An interactive program enables an audience member to send a message to the program, such that the message is received and processed by the program itself or received by the program and processed by the broadcasting service company (also referred to herein as "broadcaster" or "media seller") that aired the program. A dynamic media campaign includes media contents that can be changed or updated during the course of the campaign. For example, a dynamic media campaign may be scheduled to broadcast Program A of the campaign on a daily basis to a selected segment of the audience during the month of June, but on June $2^{nd}$ the campaign may be revised or updated to broadcast Program B of the campaign to that segment of the audience.

The platform includes interfaces for transmitting information between a media-content creator, a coordinator, and a broadcaster. For example, the information may include any one or a combination of: media content, format data, control data, message-processing instructions, timing data, address information, status information, audience-response reports, content-creation tools, audience demographic information, information on geographical range, as well as other types of information.

For the sake of simplicity, the term "interactive/dynamic" is used to refer to objects that are interactive and/or dynamic.

According to aspects of the present invention, the platform facilitates implementation of an interactive/dynamic broadcast campaign. The platform enables media buyers (e.g., media-content creators, product manufacturers, advertising agencies, political organizations, and the like) to partner with media sellers (e.g., cable operators, broadcasters, networks, media-service providers, and the like) across the lifecycle of the campaign, and provides rules-based interfaces for transmitting information between media buyers, a media coordinator, and media sellers. The interfaces function in any one or a combination of the following capacities:

as a computer-automated end-to-end sales tool for facilitating the creation of an interactive/dynamic program, the proposal process for an interactive/dynamic broadcast campaign, and the order submission and revision process for an interactive/dynamic broadcast campaign. The sales tool is sufficiently flexible to accommodate a variety of sales models;

as a multi-tiered data repository that includes information necessary to plan, execute, and monitor an interactive/dynamic broadcast campaign, to process messages received from audience members in response to an interactive/dynamic program, and to process data pertaining to interactions of audience members with an interactive/dynamic program;

as a distribution tool that enables the secure broadcasting of an interactive program as well as the secure receipt of interactive messages from audience members, while respecting applicable privacy laws and policies; and a market-based tool that enables an interactive/dynamic broadcast campaign to achieve any one or a combination of the following: to have a single interactive/dynamic program be broadcast nationally; to have a single interactive/dynamic program be broadcast to a specific geographical region; to have different interactive/dynamic programs be selectively broadcast to different geographical regions, respectively; to have a single interactive/dynamic program be broadcast to a specific demographic segment of the audience; and to have different interactive/dynamic programs be selectively broadcast to different segments of the audience, respectively.

In one embodiment, the platform is utilized to implement an interactive advertising campaign, in which an audience member may interact with an advertisement (or ad) to obtain information regarding an advertised product, information regarding the manufacturer of the product, and/or information regarding where the product may be purchased, for example. A benefit of this embodiment is that it allows a media buyer (e.g., advertising agency, product manufacturer, and the like) to obtain metrics on how audience members interact with the ad, such as metrics on the number of requests for information received for an advertised product, the geographical distribution of those requests for information, the number of requests for information received for various products in a family of products, the timing distribution of those requests, as well as other metrics that would provide insight into the interests of the audience members who experience the ad.

In another embodiment, the platform is utilized to implement an interactive broadcast campaign for a "reality-based" television program, in which an audience member may interact with televised interaction prompts to, for example, vote for a favorite contestant, vote for a least favorite actor, vote for a plot development, etc. A benefit of this embodiment is that it allows a media buyer (e.g., media-content creator, television producer, and the like) to obtain metrics on how audience members interact with the reality program, such as metrics on the number of votes obtained for each of the contestants in a contest-based reality program, polling/voting results on the likes and/or dislikes of plot developments in a serialized television program, a geographical distribution of messages received in connection with a television program, as well as other metrics that would provide insight into the interests of audience members.

In yet another embodiment, the platform is utilized to implement an interactive broadcast campaign for educational purposes, in which an audience member may interact with an interactive prompt to obtain more detailed information on a selected topic. A benefit of this embodiment is that it enables the audience member to learn about the selected topic at his or her own pace. This, in turn, encourages the audience member to be loyal to the broadcaster.

In still another embodiment, the platform is utilized to implement a dynamic advertising campaign, in which a particular type of ad is delivered to an audience member during a broadcast. For example, the broadcast may be a VOD broadcast, a DVR broadcast, a Web-based broadcast, a satellite broadcast, an RF broadcast, and the like. The campaign may have rules setting a particular type of ad to be delivered according to a category the audience member belongs to (e.g., zip code, etc.) or according to a type of the broadcast (e.g., Yankees games, Seinfeld episodes, news shows, etc.). Additionally, the rules of the campaign may be re-set or changed during the course of the campaign such that a different type of ad is delivered to the audience member than originally set.

BRIEF DESCRIPTION OF THE DRAWINGS

Further features and advantages of aspects of the present invention, as well as the structures and operations of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

DETAILED DESCRIPTION OF EMBODIMENTS OF THE INVENTION

The present invention is directed to systems and methods for implementing an interactive/dynamic broadcast campaign, in which an interactive/dynamic program is broadcast to an audience. In an interactive broadcast campaign, members of the audience may interact with media content of an interactive program that is part of the campaign. Each interactive program of an interactive broadcast campaign enables audience members to interact or send messages to the program, such that the messages are received and processed by the program itself or received by the program and processed by the broadcaster that aired the program or another party associated with the interactive program (e.g., an owner of an interactive broadcast campaign corresponding to the interactive program). In a dynamic broadcast campaign, a predetermined program is delivered to a segment of the audience under predetermined conditions (e.g., time of day, type of broadcast being experienced, etc.), and the campaign may be revised to deliver a different predetermined program to the segment of the audience or to deliver the predetermined program to a different segment of the audience. A broadcast campaign may be both interactive and dynamic.

The systems and methods of the present invention utilize a platform that facilitates the creation, execution, and monitoring of an interactive/dynamic broadcast campaign, as well as one or more interactive/dynamic programs within the campaign. The following descriptions describe the platform in connection with an interactive broadcast campaign. However, as will be readily appreciated by persons of ordinary skill in the art, the platform also may be used in connection with a dynamic broadcast campaign.

Figure 1:
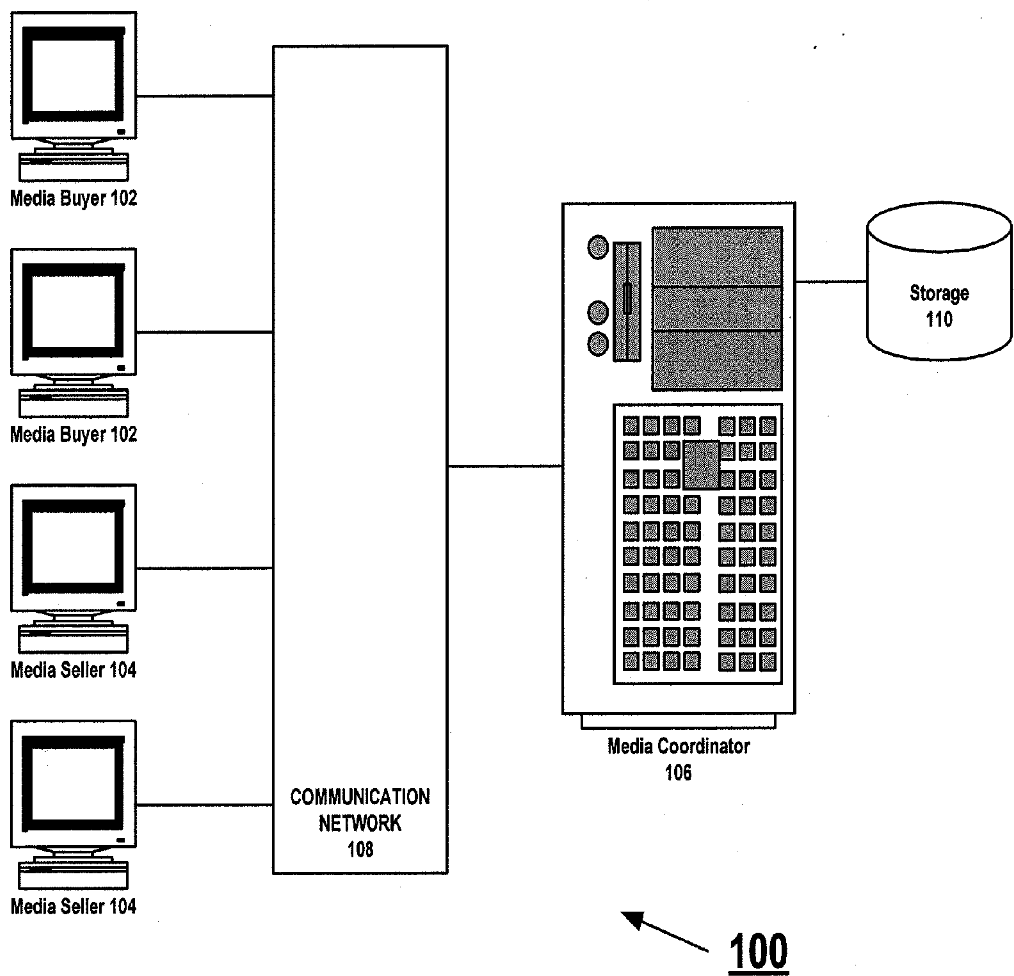
FIG. 1 is a schematic diagram of a media-campaign coordination system according to an embodiment of the present invention.

FIG. 1 schematically shows a system diagram of an exemplary media-campaign coordination system 100, according to embodiments of the present invention. The system 100 includes one or more media buyers 102, one or more media sellers 104, and a media coordinator 106, all of which are connected to a communication network 108. The media coordinator 106 may be formed of a plurality of servers or a single server equipped with one or more processors (not shown) for processing communications to and from each of the media buyers 102 and each of the media sellers 104 via the communication network 108. The media coordinator 106 includes a storage device 110 storing a control program that is executable by the one or more processors.

The communication network 108 may be the Internet, a dedicated or private communication network, a satellite communication network, or a combination thereof, or any other means of communication between the media buyers 102, the media sellers 104, and the media coordinator 106.

Each of the media buyers 102 and the media sellers 104 may include a personal computer, a workstation, or any other communication device that is able to transmit information to and receive information from the media coordinator 106 via the communication network 108.

Figure 2:
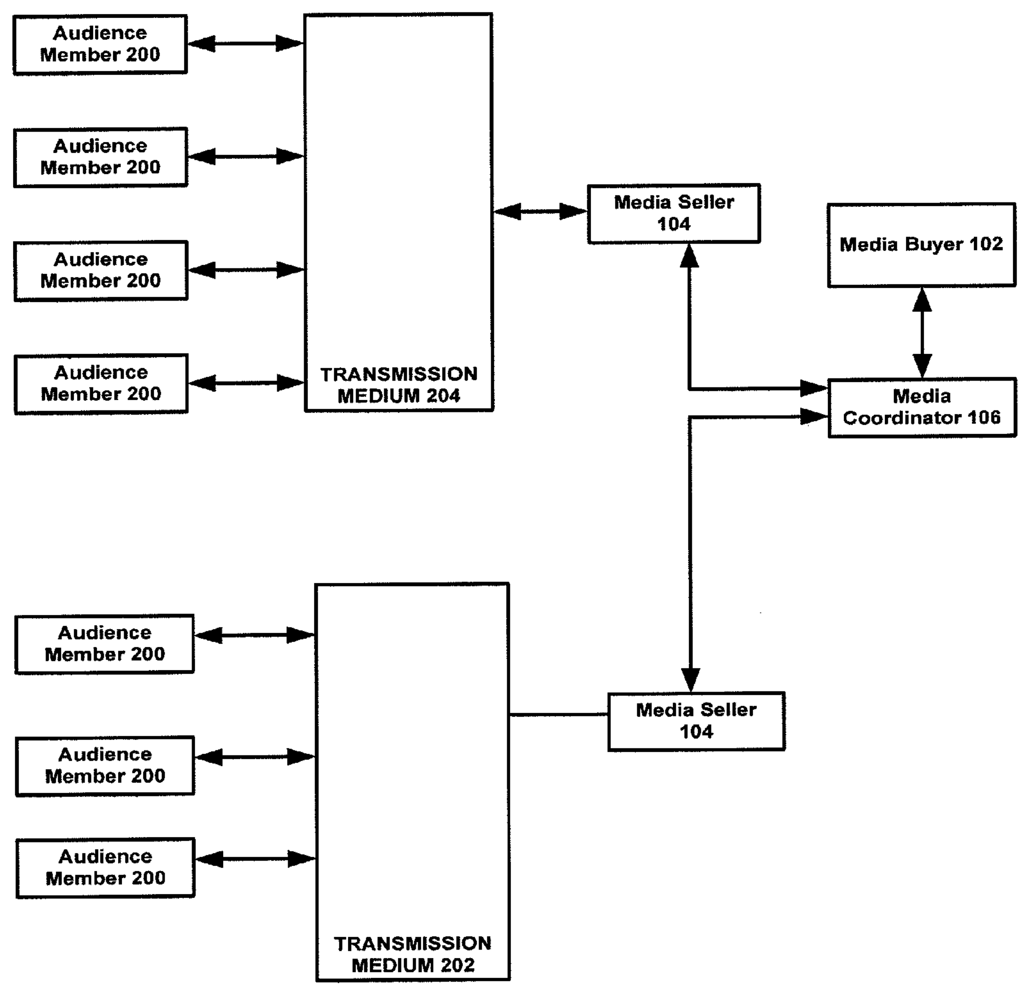
FIG. 2 is a schematic diagram illustrating an information flow arrangement according to an embodiment of the present invention.

The control program, when executed by the media coordinator 106, provides a platform for implementing an interactive broadcast campaign. As schematically shown in FIG. 2, a media buyer 102 provides media content(s) and other campaign information for one or more interactive programs of the campaign to the media coordinator 106. The media coordinator 106 provides to one or more media sellers 104 that are involved in the campaign the media content(s) and information needed to broadcast the interactive program(s). The media seller(s) 104 broadcast the interactive program(s) to audience members 200 via respective transmission media 202, 204. The audience members 200 interact with the interactive program(s), thus causing messages to be sent back to the media seller(s) 104 via the transmission media 202, 204. The media seller(s) 104 receive and process the messages from the audience members 200, and provide a report on the interactive activity generated by the campaign.

The transmission media 202, 204 may include, for example, a cable system, a satellite system, an analog broadcast system, a digital broadcast system, and any other type of transmission system that is able to broadcast an interactive program and to relay messages from audience members 200 to the media seller(s) 104 in response to the interactive program. For example, the transmission media 202, 204 may be different cable systems serving different geographical regions.

Audience interaction with an interactive program may take place via standard controller technology, such as technology used in "pay-per-view" type applications, in which a viewer (audience member 200) may designate a desired program selection using a remote controller.

Figure 3:
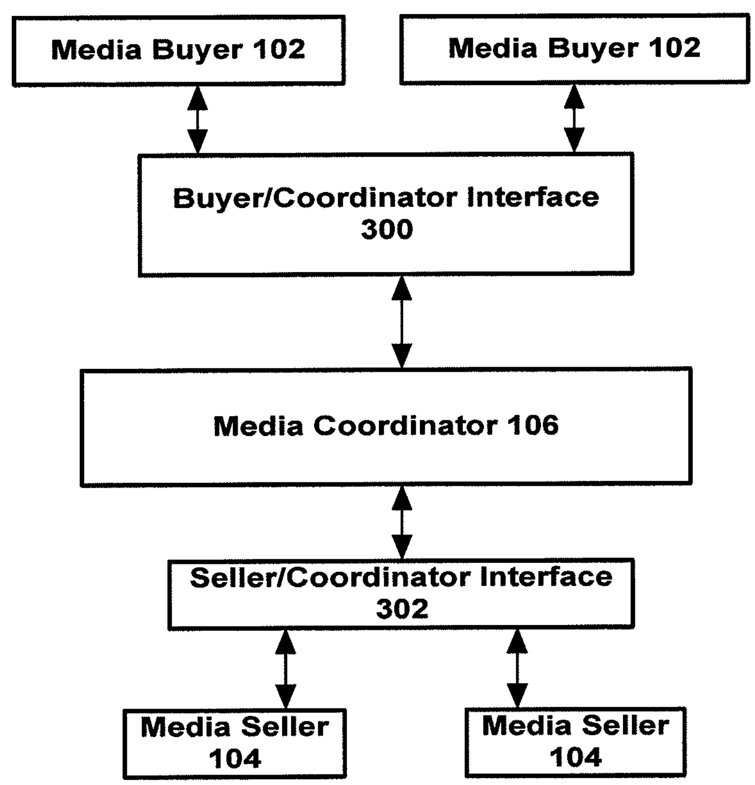
FIG. 3 is a schematic diagram illustrating a platform for transmitting information between media buyers, media sellers, and a media coordinator, according to an embodiment of the present invention.

As indicated above, the control program provides a platform for implementing an interactive broadcast campaign. The platform includes interfaces for transmitting information between media buyers 102, media sellers 104, and the media coordinator 106, as schematically shown in FIG. 3. For example, the information may include any one or a combination of: media content, format data, control data, message-processing instructions, timing data, address information, status information, audience-response reports, content-creation tools, audience demographic information, information on geographical range, as well as other types of information.

A buyer/coordinator interface 300 serves to transmit information between media buyers 102 and the media coordinator 106. For example, a media buyer 102 may user the interface 300 to plan, execute, and pay for an interactive broadcast campaign. Further details regarding this interface 300 are provided below.

A seller/coordinator interface 302 serves to transmit information between media sellers 104 and the media coordinator 106. Further details regarding this interface 302 are provided below.

Although the media coordinator 106, the buyer/coordinator interface 300, and the seller/coordinator interface 302 are shown in FIG. 3 to be separate entities, the interfaces 300, 302 are implemented by the media coordinator 106 and presented to the media buyers 102 and the media sellers 104 by the media coordinator 106.

As used herein, "dynamic content" and "interactive program" may be used interchangeably to refer to traditional multimedia elements (e.g., images, text, audio, video, and the like) combined with executable elements, real-time signaling elements, and/or elements that manage a presentation context of an interactive program (e.g., presenting a program only in certain independent media streams, presenting a program only for certain viewers, and the like).

As used herein, "campaign" refers to a logical entity that includes business, processing, distribution, and presentation rules for a collection of interactive programs, as well as media contents for the interactive programs.

As used herein, "lifecycle of a campaign" includes: creation of business relationships between media buyers (e.g., content owners) and media sellers (e.g., distributors) regarding an interactive broadcast campaign; creation and documentation of rules pertaining to the distribution and presentation of dynamic contents; transmission of the documentation, the dynamic contents and associated data between media buyers and media sellers; delivery of the dynamic contents; presentation or execution (i.e., broadcasting) of the dynamic contents; monitoring of an execution status; and measurement of interactive activity associated with the dynamic contents.

As used herein, the term "video" may include accompanying audio as well.

As used herein, the terms "audience member," "viewer," and "subscriber" may be used interchangeably to refer to someone who views or experiences an interactive program that is broadcast by a media seller.

Figure 4:
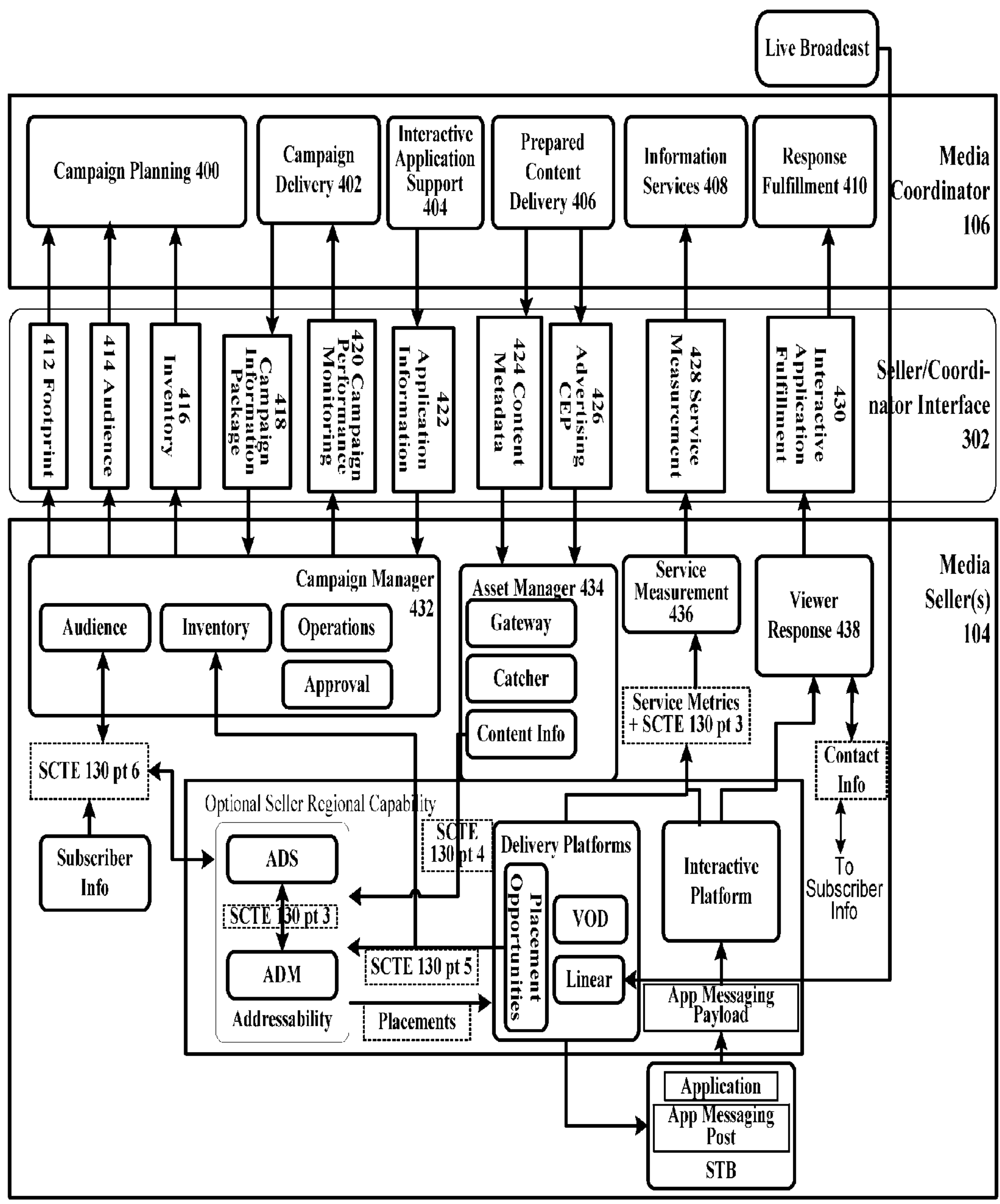
FIG. 4 schematically illustrates a seller/coordinator interface used for transmitting information between media sellers and a media coordinator, according to an embodiment of the present invention.

FIG. 4 schematically illustrates details of the functionality of the seller/coordinator interface 302 and the relationship between the media coordinator 106 and the media sellers 104, according to an embodiment of the present invention. Although FIG. 4 shows only a single media seller 104 for the sake of clarity and simplicity, it is to be understood that the seller/coordinator interface 302 may be used by multiple media sellers 104 to communicate with the media coordinator 106.

As shown in FIG. 4, the media coordinator 106 includes a campaign planning submodule 400, a campaign delivery submodule 402, an interactive applications support submodule 404, a media-content delivery submodule 406, an information services submodule 408, and a viewer-response fulfillment submodule 410.

The campaign planning submodule 400 is configured to provide an interface for supporting the pre-execution phases of an interactive broadcast campaign, including an "onboarding" phase in which the media coordinator 106 and a media buyer 102 agree to work together, a campaign bid and request-for-proposal (or RFP) phase, and an inventory query and reservation phase, for example. Additionally, the campaign planning submodule 400 is configured to provide an interface for receiving from a media seller 104, via the seller/coordinator interface 302, any one or a combination of: footprint information 412, audience information 414, and inventory information 416 pertaining to the media seller 104.

The footprint information 412 may include, for example, any one or a combination of: one or more geographical regions served by the media seller 104, a number of households served by the media seller 104 and having interactive service, demographic information on the households served by the media seller 104 and having interactive service, and other information pertaining to the potential broadcasting reach of the media seller 104. The footprint information 412 may be used during the planning stage of an interactive broadcast campaign.

The audience information 414 also may be used during the planning stage of an interactive broadcast campaign, to target campaign elements to specific geographic, demographic, and psychographic segments of the audience. For example, the audience information 414 may include any one or a combination of: one or more geographical regions of viewers served by the media seller 104, demographic information of the viewers served by the media seller 104, and psychographic information of the viewers served by the media seller 104.

The inventory information 416 also may be used during the planning stage of an interactive broadcast campaign, to determine the reach of the campaign. This information 416 may include, for example, any one or a combination of: available advertisement spots during scheduled broadcast programs, available openings for broadcast programs, and pricing information.

The campaign delivery submodule 402 is configured to provide an interface for performing, via the seller/coordinator interface 302, at least one of: providing to the media seller 104 a campaign information package 418 pertaining to an interactive broadcast campaign, and receiving performance information 420 from the media seller 104 regarding the interactive broadcast campaign.

The performance information 420 may include, for example, status information on a current execution status of the interactive program campaign, thus enabling the execution of the campaign to be monitored in real-time. The information 420 also may be used to adjust aspects of a campaign or to detect execution failures.

The campaign information package 418 includes information used by the media seller 104 to broadcast media contents of the interactive broadcast campaign and to interpret and fulfill viewer messages corresponding to interactions with the interactive program (or programs) of the campaign. That is, the campaign information package 418 may be considered a fundamental data package that drives all of the interactive processes of the campaign. The information is used by the media seller 104 to execute a campaign, deliver measurement information, and to fulfill interactive responses from viewers. For example, the campaign information package 418 may include any one or a combination of: configuration information used for broadcasting the media contents of the campaign, delivery information used for delivering the media contents to a designated destination, identifiers for resolving measurement categories with the viewer messages corresponding to interactions with the interactive program(s), addresses for delivery of the viewer messages, and addresses for delivery of measurement data.

The interactive applications support submodule 404 is configured to provide an interface for providing to the media seller 104, via the seller/coordinator interface 302, processing information 422 for an interactive program. The processing information 422 may include, for example, any one or a combination of: interactive response handling information used to enable viewer interaction with the interactive program, application templates used for configuring an interactive broadcast campaign, and information for managing the distribution of interactive assets or media contents to the media seller 104 for broadcasting.

The media-content delivery submodule 406 is configured to provide an interface for providing to the media seller 104, via the seller/coordinator interface 302, media content for an interactive program corresponding to the interactive broadcast campaign. Included with the media content is at least one of: content metadata 424 and a content encoding profile 426.

The content metadata 424 may include, for example, format data regarding an entertainment content of the interactive program, format data regarding an advertising content of the interactive program, or both. The content metadata 424 is used to ingest and to distribute the media content of the interactive program to the media seller 104.

The content encoding profile 426 may include, for example, encoding information used to facilitate any one or a combination of: ingestion of the interactive program, distribution of the interactive program, and presentation of the interactive program. For instance, the content encoding profile 426 may define characteristics of the interactive program (e.g., an interactive advertisement, a live interactive program, etc.).

The information services submodule 408 is configured to provide an interface for receiving from the media seller 104, via the seller/coordinator interface 302, service measurement information 428 regarding performance characteristics of the interactive broadcast campaign. The service measurement information 428 may include, for example, information used for any one or a combination of: campaign planning, campaign evaluation, and campaign billing. The information services submodule 408 also may be configured to aggregate measurement data from the media seller 104.

The viewer-response fulfillment submodule 410 is configured to provide an interface for receiving from the media seller 104 results of viewer interactions 430 with the interactive program. For example, the results of the viewer interactions 430 may be in the form of results that are aggregated according to predefined criteria, such as a geographical region, a time range, a date range, a viewer-demographic category, and the like. The viewer interactions 430 may originate as messages sent to set-top boxes (also referred to herein as "STBs") via remote controllers manipulated by the users due to a prompt by the interactive program, and the messages sent to the STBs are relayed or transmitted by the STBs to the media seller 104.

As shown in FIG. 4, the media seller 104 includes a campaign manager submodule 432, an asset manager submodule 434, a service measurement submodule 436, and a viewer response submodule 438.

The campaign manager submodule 432 provides information to the media coordinator 106 to support the development and execution phases of an interactive broadcast campaign, and receives instructional information from the media coordinator 106. For example, this submodule 432 is configured to provide an interface for performing, via the seller/coordinator interface 302, any one or a combination of: providing footprint information 412 to the media coordinator 106, providing audience information 414 to the media coordinator 106, providing inventory information 416 to the media coordinator 106, providing to the media coordinator 106 performance information 420 regarding an interactive broadcast campaign, receiving from the media coordinator 106 a campaign information package 418 pertaining to an interactive broadcast campaign, and receiving from the media coordinator 106 processing information 422 for an interactive program.

The asset manager submodule 434 is configured to provide an interface for receiving, via the seller/coordinator interface 302, media content (i.e., audio/video and interactive features) of an interactive program along with content metadata 424 and/or a content encoding profile 426. As described above, the content metadata 424 may include, for example, format data regarding the media content of the interactive program; and the content encoding profile 426 may include, for example, encoding information used to facilitate any one or a combination of: ingestion of the interactive program, distribution of the interactive program, and presentation or broadcasting of the interactive program.

The service measurement submodule 436 is configured to provide, via the seller/coordinator interface 302, an interface for providing to the media coordinator 106 measurement information 428 regarding performance characteristics of an interactive broadcast campaign. The performance characteristics may include, for example, any one or a combination of: channel tuning data, interactive lifecycle and presentation data, "on-demand" session data, and the like. The measurement information may be aggregated before being provided to the media coordinator 106. The measurement information 428 may include service measurement data obtained during the course of a campaign. That is, the execution of a campaign may be comprehensively measured during the course of the campaign to obtain information on, for example, the households reached by the campaign, the number of requests for a program, the duration of viewing of a program, etc. The service measurement data may be used to optimize the current campaign or future campaigns. In optimizing a current dynamic broadcasting campaign, the service measurement data may be used to demonstrate that a relatively small percentage of a targeted audience has responded to or requested Program A, whereas a relatively large percentage of the targeted audience has responded to or requested Program B. This data may be used to discontinue Program A in favor of Program B for the targeted audience, for the remainder of the campaign's duration. The service measurement data is collected and reported to the campaign's owner, for example, so that the data can be used to monetize the campaign by demonstrating its successful execution and its reach and response rates. For example, a campaign may pay a set amount of money for each actually household reached by the campaign (e.g., each household to which a program of the campaign is delivered); the service measurement data may be used to determine the total amount to be paid. Additionally, the service measurement data may be used to forecast the success of future campaigns, and also may serve as a basis for analyzing viewership trends/characteristics of campaigns.

The viewer response submodule 438 is configured to provide, via the seller/coordinator interface 302, an interface for providing to the media coordinator 106 results of viewer interactions 430 with an interactive program. The results may be aggregated or simply may be routed for "upstream" delivery.

Although FIG. 4 is described above generally to have one interactive program in the interactive broadcast campaign, other embodiments of the present invention may include multiple interactive programs within a single interactive broadcast campaign, with each of the multiple programs being separately addressed by the various submodules of the media coordinator 106.

Figure 5:
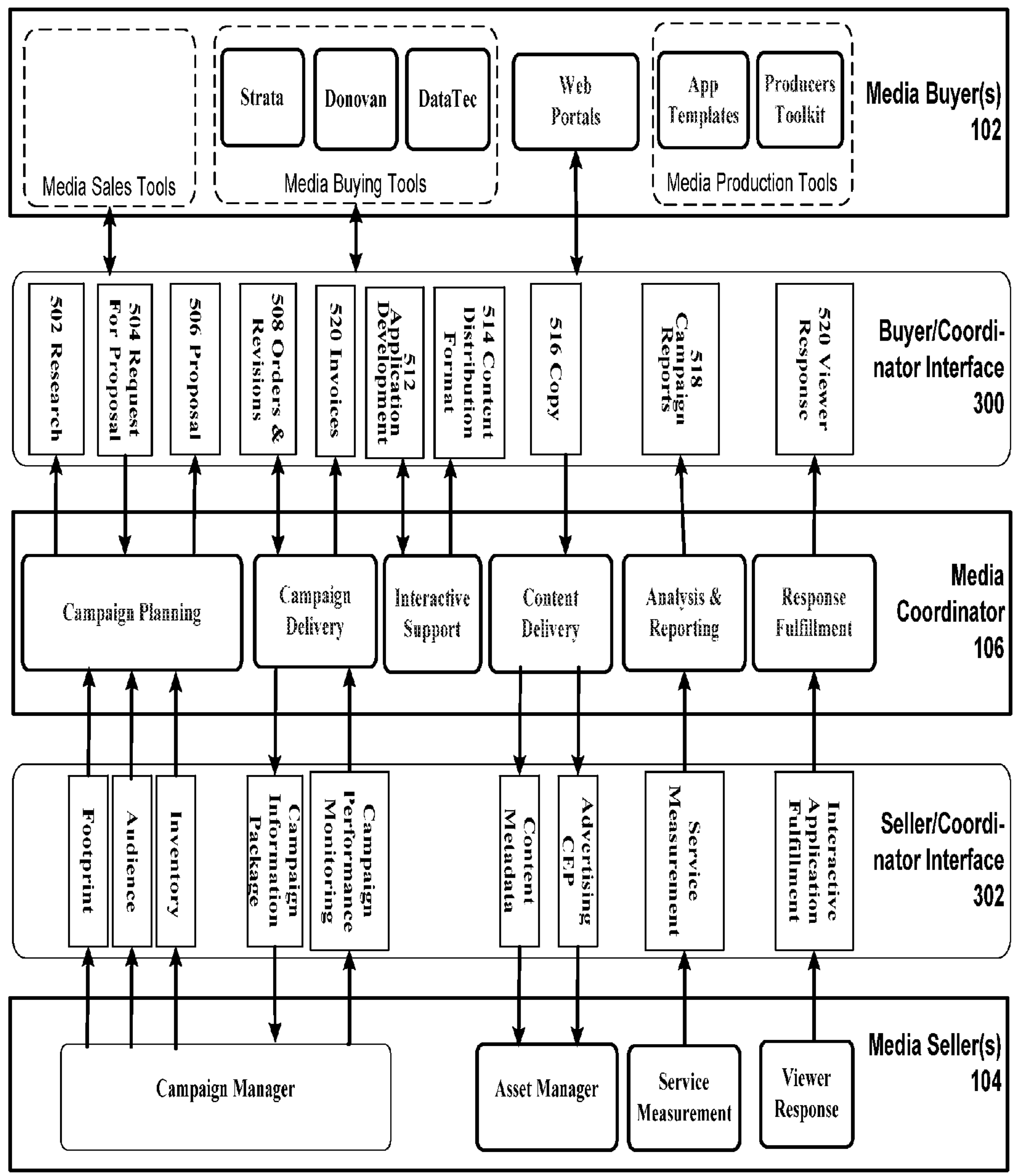
FIG. 5 schematically illustrates a buyer/coordinator interface used for transmitting information between media buyers and a media coordinator, according to an embodiment of the present invention.

FIG. 5 schematically illustrates details of the functionality of the buyer/coordinator interface 300 and the relationship between the media coordinator 106 and the media buyers 102, according to an embodiment of the present invention. The buyer/coordinator interface 300 serves to transmit information between the media buyers 102 and the media coordinator 106. Although FIG. 5 shows only a single media buyer 102 for the sake of clarity and simplicity, it is to be understood that the buyer/coordinator interface 300 may be used by multiple media buyers 102 to communicate with the media coordinator 106.

As shown in FIG. 5, the buyer/coordinator interface 300 includes any one or a combination of: a campaign research submodule 502; a request submodule 504; a proposal submodule 506; an order submodule 508; an invoice submodule 510; an application development submodule 512; a content distribution information submodule 514; a copy submodule 516; a service report submodule 518; and a viewer response submodule 520.

The campaign research submodule 502 is configured to provide an interface for providing research information to the media coordinator 106 via the buyer/coordinator interface 300. The request submodule 504 is configured provide an interface for receiving a proposal request for an interactive broadcast campaign from the media coordinator 106 via the buyer/coordinator interface 300. The proposal submodule 506 is configured to provide an interface for providing a campaign proposal to the media coordinator 106 via the buyer/coordinator interface 300. The order submodule 508 is configured to provide an interface for receiving, from the media coordinator 106 via the buyer/coordinator interface 300, an order for an interactive broadcast campaign, based on a campaign proposal. The order submodule 508 also may be configured to provide an interface for enabling revisions to the order. The invoice submodule 510 is configured to provide an interface for providing to the media coordinator 106, via the buyer/coordinator interface 300, an invoice for a completed order.

The application development submodule 512 is configured to provide to the media coordinator 106, via the buyer/coordinator interface 300, an application programming interface for enabling interactive functions to be incorporated in an interactive program. The content distribution format submodule 514 is configured to provide an interface for receiving from the media coordinator 106, via the buyer/coordinator interface 300, application resources to be used by a stream generator for a live interactive program. The copy submodule 516 is configured to provide an interface for providing to the media coordinator 106, via the buyer/coordinator interface 300, a copy of media content to be broadcast by a media seller 104. The service report submodule 518 is configured to provide an interface for providing a service report to the media coordinator 106 via the buyer/coordinator interface 300. The service report may include, for example, information pertaining to a status of an interactive broadcast campaign. The viewer response submodule 520 is configured to provide an interface for providing a viewer-response report to the media coordinator 106 via the buyer/coordinator interface 300. The viewer-response report may include, for example, information pertaining to results of viewer interactions with an interactive program.

Figure 6:
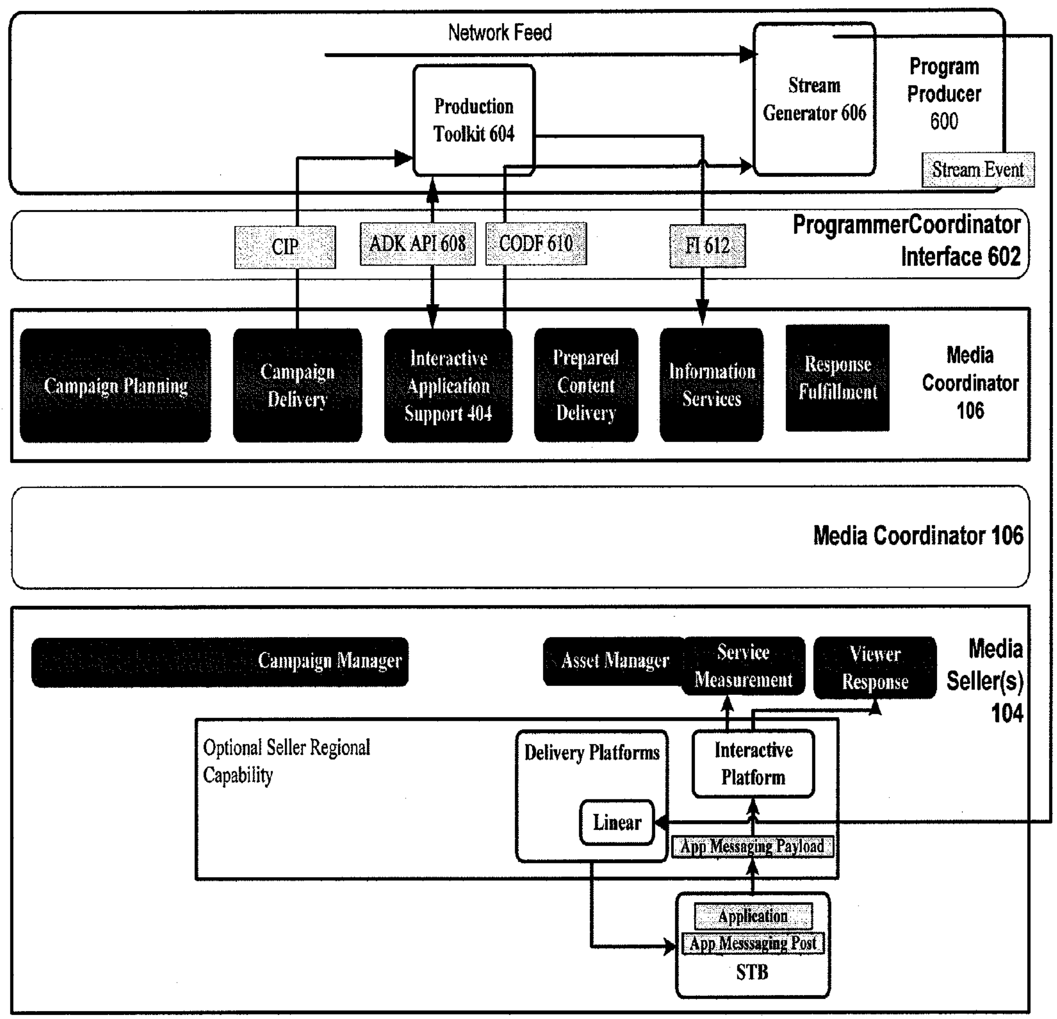
FIG. 6 schematically illustrates a programmer/coordinator interface used for transmitting information between a media coordinator and a program producer, according to an embodiment of the present invention.

As shown in FIG. 6, in an embodiment of the present invention, the media coordinator 106 is configured to communicate with a program producer 600 via a programmer/coordinator interface 602. The program producer 600 operates in coordination with a media buyer 102 to produce an interactive program for an interactive broadcast campaign. The program producer 600 includes a production toolkit submodule 604 and/or a stream generator submodule 606.

The production toolkit submodule 604 is configured to provide an interface for transmitting information to and receiving information from the media coordinator 106. The information transmitted to the production toolkit submodule 604, via the programmer/coordinator interface 602, includes information used to produce an interactive program suitable for broadcasting by one or more of the media sellers 104 as part of an interactive program campaign. For example, the information transmitted to the production toolkit submodule 604 may include application development information 608 and/or content distribution information 610.

The application development information 608 is used to provide an application programming interface for enabling interactive functions to be incorporated in an interactive program. The content distribution information 610 includes application resources and is transferred from the production toolkit submodule 604 to the stream generator submodule 606. The application resources are used by the stream generator submodule 606 to produce a live interactive program (i.e., a live program with interactive features incorporated therein) and to transmit the live interactive program directly to one or more of the media sellers 104 for broadcasting as part of an interactive program campaign.

The media coordinator 106 receives from the production toolkit submodule 604, via the programmer/coordinator interface 602, fulfillment information 612. For example, the information services submodule 408 of the media coordinator 106 may be configured to receive the fulfillment information 612. The fulfillment information 612 may include, for example, runtime data pertaining to interactive features of an interactive program displayed during broadcasting of the interactive program.

The application programming interface of the application development information 608 may include, for example, a set of customizable application templates for enabling a media producer to customize a predefined set of interactive functions to suit objectives of a media buyer 102 associated with the media producer.

The application resources of the content distribution information 610 transferred to the stream generator submodule 606 may include, for example, any one or a combination of: configuration metadata for signaling pertaining to a streaming generator, configuration metadata for timing parameters pertaining to the stream generator, ETV (or enhanced TV) formatted files, and OCAP (or open cable application platform) formatted files. The stream generator embeds the application resources in a stream of media content to be broadcast live. As will be appreciated by persons skilled in the art of broadcasting, formats and techniques other than ETV and OCAP may be used, such as video-on-demand, interactive cable, interactive TV, enhanced binary interchange format (or EBIF), etc.

According to an embodiment of the present invention, an interactive broadcast campaign may be a request-based interactive broadcast campaign. An interactive program of such a campaign enables a viewer to interact with a display screen (e.g., a television monitor) to request information regarding content displayed on the display screen. In this embodiment, the information requested by the viewer is delivered to the viewer as an electronic document, or as a hardcopy document, or as both an electronic document and a hardcopy document.

For example, the request-based interactive program campaign may be an advertising campaign for a product or a service (also referred to herein as "product/service" for simplicity). The display screen may display an advertisement for the product/service, with an interactive feature that enables the viewer to request additional information regarding the product/service. The additional information may include, for example, information on price, vendor locations, product details, special promotions, etc. The viewer may request any (or all) of the additional information by using a selection device, such as a remote controller, to make one or more selections. If the viewer is registered with a corresponding media seller 104 that broadcasted the advertisement (e.g., the request is received from a cable subscriber household), the requested information is sent to the viewer in accordance with delivery information on file or registered for the viewer. Optionally, the viewer also may include with the request an electronic address or a street address for delivery of the requested information. A beneficial aspect of this embodiment is that the media seller 104 is able to obtain statistics regarding the numbers and types of viewers who express an interest in a product/service.

In another example, the request-based interactive program campaign may be a "get-out-the-vote" type non-partisan campaign for educating voters on candidates taking part in an election, as well as issues of interest in the election. The display screen may display a promotional video on the election, with an interactive feature that enables the viewer to request additional information. The additional information may include, for example, information on each candidate, information on voter registration locations and requirements, information on an issue and where each candidate stands on that issue, etc. A beneficial aspect of this embodiment is that the media seller 104 is able to obtain statistics regarding the election candidates and issues of interest to the viewers served by the media seller 104.

According to another embodiment of the present invention, an interactive broadcast campaign may be an on-demand interactive broadcast campaign. An interactive program of such a campaign enables a viewer to interact with a display screen to view a content item selected via the display screen, such that a selection made by the viewer causes the selected content item to be displayed on the display screen.

For example, the on-demand interactive broadcast campaign may an advertising campaign for a product/service. The display screen may display an advertisement for the product/service, with an interactive feature that enables the viewer to demand (i.e., request immediate delivery) of additional information regarding the product/service via the display screen. When the viewer makes a demand using a selection device, such as a remote controller, to make a selection, the demanded additional information regarding the product/service is promptly displayed on the display screen. The selected additional information may, in turn, be an interactive advertisement that enables the viewer to obtain further information or details regarding the product/service. A beneficial aspect of this embodiment is that the media seller 104 is able to obtain statistics regarding the numbers and types of viewers who express an interest in a product/service. Another beneficial aspect of this embodiment is that the viewer can be provided with selected information upon demand, i.e., immediately, and the viewer can make further selections to obtain information regarding the product/service at the level of detail desired by the user.

For instance, a short-form interactive program may have an interactive function that enables a viewer to view a corresponding long-form program upon demand, in which the long-form program expands on information introduced in the short-form program.

In another instance, the on-demand interactive advertisement may be for an automobile manufacturer. The viewer may select (i.e., demand) additional information on pick-up trucks, SUVs, sedans, convertibles, sports cars, mini-vans, hybrid cars, etc., made by the manufacturer. When the viewer interacts with the advertisement to demand information on sedans, the sedan branch of the advertisement is displayed to the viewer. In turn, while viewing the sedan branch, when the viewer demands information on a particular type of sedan, the advertisement displays information from the selected sub-branch, and so on. This type of branching of information provided to the viewer may also be referred to herein as "telescoping."

In another example, the on-demand interactive broadcast campaign may be for an educational campaign, such as for educating television viewers regarding an upcoming change in broadcasting format to a digital format, for example. The display screen may display a promotional video on the upcoming change, with an interactive feature that enables the viewer to request additional information. The additional information may include, for example, information on how the change is to be implemented, how viewers may be affected, equipment requirements, etc. When the viewer interacts with the video to demand information on equipment requirements, the equipment branch of the video is displayed to the viewer. In turn, while viewing the equipment branch, when the viewer demands information on vendors for a particular type of equipment, the video displays information from the selected sub-branch, and so on.

According to yet another embodiment of the present invention, an interactive broadcast campaign may be a vote/poll-based interactive program campaign. An interactive program of such a campaign enables a viewer to interact with a display screen to place a vote or take part in a poll regarding content displayed on the display screen.

For example, the vote/poll-based interactive broadcast campaign may be for a reality-based television show, in which viewers may place votes that determine how the show will proceed. During broadcasting of the show, the display screen may display a prompt, indicating to the viewer to input a response to the prompt, such as by making a selection from a list of options. The show may be a live broadcast or a pre-recorded broadcast. The number of votes may be used to determine, for example, whether a participant on the show is permitted to return for another show, a song to be sung by a participant on the current or on a subsequent show, a prize to be awarded to a participant, etc.

For instance, the vote/poll-based interactive program may be for a live game show. Viewers interact with prompts displayed during the program to select, for example, a category of questions to be answered by the contestants, a prize to be awarded for a correct answer, a penalty to be incurred for a wrong answer, etc. A beneficial aspect of this embodiment is that votes can be tallied or counted quickly so that the results can be used to affect a current outcome of a show as it is happening, thus providing a way to keep the viewers' attention for the entire show.

As indicated above, interactive broadcast campaigns provide a means for media buyers 102 to obtain information on the viewing habits, interests, and purchasing habits of the viewers. For example, media sellers 104 that broadcast a request-based interactive program can obtain information on any one or a combination of the following types of information: a total number of requests for information, a regional distribution of the requests for information, and a distribution of the requests for information based on a psychographic characteristic.

Similarly, media sellers 104 that broadcast an on-demand interactive program can obtain information on any one or a combination of the following types of information: a total number of requests to view a program, a distribution of durations that a program is viewed, a distribution of times when requests to view a program are made, a distribution of ad selections made by viewers with respect to a plurality of programs offered for selection, a distribution of telescoping selections made by viewers in response to a telescoping program, a regional distribution of a selected program, and a distribution of a selected program based on psychographic subscriber characteristics.

Also similarly, media sellers 104 that broadcast a vote/poll-based interactive program can obtain information on any one or a combination of the following types of information: a distribution of votes or polls made by viewers with respect to a plurality of items offered for voting or polling, a regional distribution of votes or polls made by viewers with respect to a plurality of items offered for voting or polling, and a distribution votes or polls based on psychographic subscriber characteristics.

In turn, the media sellers 104 can provide summary reports on how viewers responded to the interactive programs, which media buyers 102 can use for market research purposes, for example.

According to another embodiment of the present invention, an interactive broadcast campaign may include different interactive programs directed to different segments of the audience covered by the media seller(s) 104 broadcasting the interactive programs. This enables media buyers 102 to target a product, for example, to audience members belonging to a particular consumer group or a particular demographic category.

For example, an interactive broadcast campaign may include a main program that is in English, with an interactive feature that enables viewers to select to view additional information in a particular language format. The additional information provided to the viewers need not only be in the chosen language format, it also may include a wholly different video with different characters and story lines than the additional information provided for a different chosen language format. That is, the additional information is produced by taking into account the ethnic background of the audience members corresponding to a particular language format, such that actors, music, story themes, etc., are compatible with that ethnic background. For instance, when a viewer selects to view additional information in a Spanish format, the additional information may include actors, music, and story themes, etc., of interest to Hispanic or Latino audience members.

In another example, an interactive broadcast campaign may include several different interactive programs encoded so that media sellers 104 can broadcast a specific program to a specific segment of the viewing audience. For instance, if the interactive broadcast campaign is for a type of soda, the interactive broadcast campaign may include coding that enables a media seller 104 to broadcast a child-friendly interactive soda advertisement to a kids-oriented cable channel (e.g., Nickelodeon™, Disney™), a feminine-themed interactive soda advertisement to a cable channel directed to women (e.g., We™, Oxygen™, Lifetime™), a sports-themed interactive soda advertisement to a sports channel (e.g., YES™, ESPN™ MSG™), and a masculine-themed interactive soda advertisement to a cable channel directed to men (e.g., Spike TV™, TNT™).

In another example, an interactive broadcast campaign may include several different interactive programs encoded so that media sellers 104 can broadcast a specific program to a specific segment of the viewing audience. For instance, if the interactive broadcast campaign is for a car manufacturer, the interactive broadcast campaign may include coding that enables a media seller 104 to broadcast an advertisement for an economy car to households of a particular zip code and to broadcast an advertisement for a luxury car to households of another zip code. For this example, a decision on the type of advertisement shown for any particular zip code may be based on market data on the average disposable income for residents within that zip code.

In yet another example, an interactive broadcast campaign may include an interactive program that is encoded so that multiple media sellers 104 can broadcast the program nationwide, and so that viewer responses or interactive messages received by the multiple media sellers 104 may be easily summarized into a single report. For instance, the interactive program may be an interactive advertisement for a new type of mobile telephone, for which the media buyer 102 responsible for producing the interactive program has arranged via the media coordinator 106 to have the interactive program broadcast nationwide during a pre-selected week. The encoding enables the multiple media sellers 104, which may serve different geographical regions or different populations with the same geographical region, to have a consistent way to receive and interpret the messages from the STBs, for example, thus enabling easy aggregation of the messages for statistical purposes.

According to an embodiment of the present invention, a dynamic broadcast campaign may include a program to be broadcast to a selected category of viewers. For example, the program may be a Ford™ pick-up truck advertisement, which is to be broadcast to viewers of a boxing match as part of a Ford™ campaign. The broadcast can be live or recorded. For example, the truck advertisement may be aired during a live broadcast of the boxing match, a VOD broadcast of the boxing match, a DVR-recorded playback of the boxing match, a Web-based broadcast of the boxing match, a satellite transmission of the boxing match, etc. The truck advertisement may be an interactive advertisement. After the Ford™ campaign has begun, a decision can be made to change the program from the truck advertisement to an advertisement for a Ford™ sedan, such that the sedan advertisement is aired during a broadcast of the boxing match.

According to another embodiment of the present invention, a dynamic broadcast campaign may include different programs to be broadcast to different categories of viewers. For example, the campaign may be an advertising campaign for a national restaurant franchise, such that different advertisements are aired during news programs in different geographical locations of the country. For instance, a restaurant advertisement with country music may be aired in regions known to favor country music, an advertisement with hip-hop music may be aired in urban locations, etc.

In an embodiment of the present invention, information transmitted between a media seller 104 and the media coordinator 106 is in accordance with a transmission protocol. For example, the transmission protocol may include a Web services protocol that utilizes a SOAP messaging interface and an HTTP or an HTTPS messaging protocol. Data transmitted between the media seller 104 and the media coordinator 106 conform with a set of pre-defined XML schema.

For example, service measurement information transmitted between the service measurement submodule 436 of the media seller 104 and the media coordinator 106 may include a service measurement header portion and a measurement data portion. The service measurement header portion may include, for example, any one or a combination of: a version identifier for identifying a protocol version to be used for a message received from a viewer, a timestamp for indicating a reference time of the received message, and a geographic identifier for indicating a zip code or a system code for identifying a geographical location of the received message. The measurement data portion may include, for example, any one or a combination of: a programming event identifier (or PEID), which identifies a scheduled program corresponding to the received message (e.g., Yankees/Red Sox game broadcast at 1 pm ET on Jun. 1, 2008); an enhanced program sequence identifier (or EPSID), which identifies a sequence within the PEID (e.g., a sequence of interactive prompts associated with a voting/polling event); and an event identifier (or EventID), which identifies a reportable event (e.g., a poll question, an interactive prompt, etc.) within the EPSID.

Similarly, in another example, viewer response information (e.g., application fulfillment information) transmitted between the viewer response submodule 438 of the media seller 104 and the media coordinator 106 may include a fulfillment header portion and an event data portion. The fulfillment header portion may include, for example, any one or a combination of: a version identifier, a timestamp, and a geographic identifier. The event data portion may include, for example, any one or a combination of an event type identifier, a PEID, an EPSID, and an EventID. The EventID identifies a discreet event that occurred during an EPSID, such as a channel change by the viewer, or an exit from a telescoping or branching sequence.

The event type identifier identifies the type of the interactive program corresponding to a message received from a viewer. For example, the event type identifier may identify that the interactive program is a vote/poll-based interactive program, or a request-based interactive program, or an on-demand interactive program. In the case of a request-based interactive program, the event type identifier may include subscriber information, such as the street address or the telephone number corresponding to the STB from where the received message originated, for example. In the case of a vote/poll-based interactive program, the event type identifier may be used to carry an aggregated voting/polling result.

Figure 7:
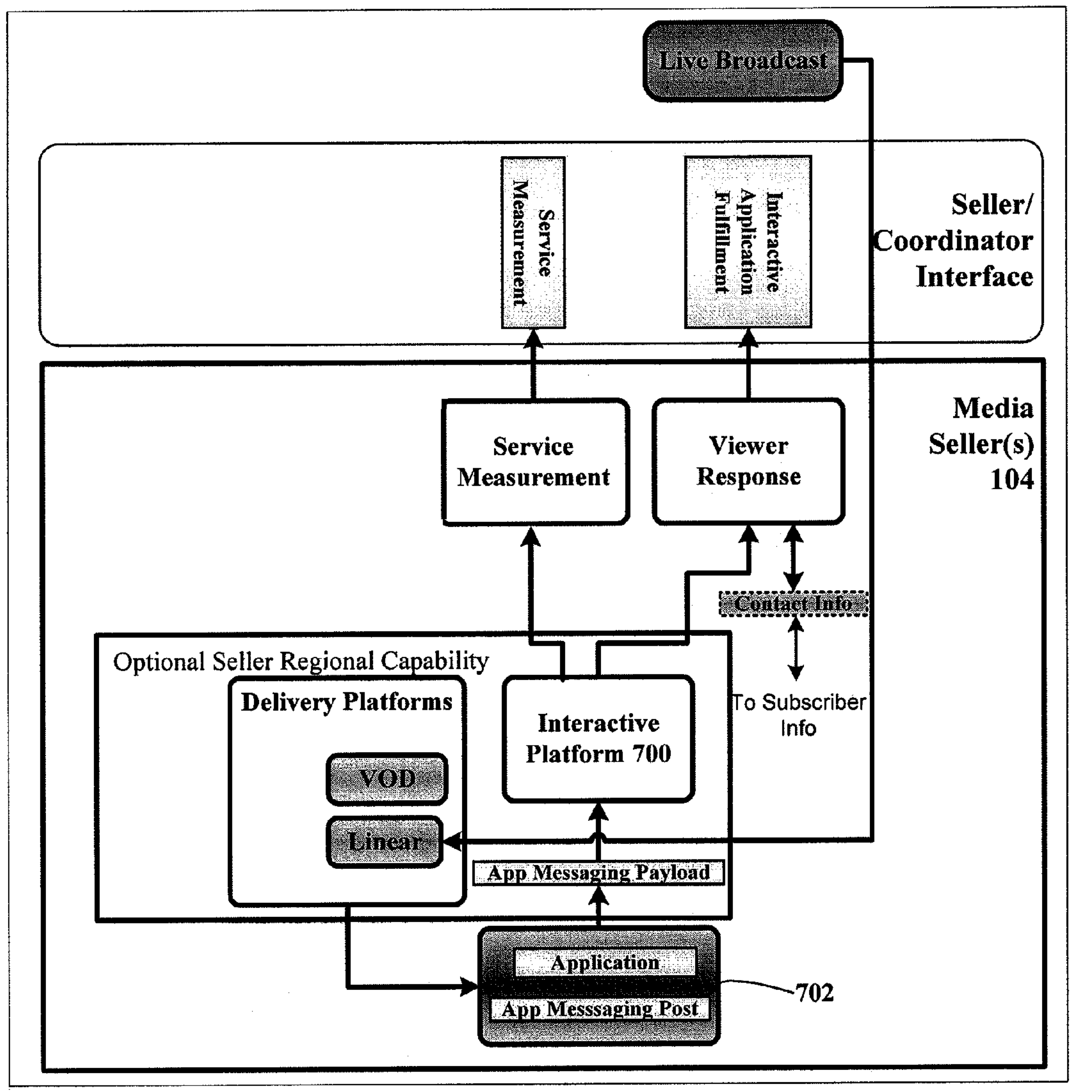
FIG. 7 schematically illustrates an interactive platform for receiving and processing messages from audience members, according to an embodiment of the present invention.

In another embodiment of the present invention, information transmitted between a viewer, via a STB 702, and a media seller 104 takes place via an interactive platform 700 in accordance with a transmission protocol, as schematically shown in FIG. 7. The transmission protocol utilizes a set of predefined XML schema to transfer messages from the STB 702 to an interface provided by the interactive platform 700. The application formats that conform with the transmission protocol include, for example, ETV and OCAP, both of which support an HTTP messaging protocol.

For example, an application message transmitted between the STB 702 and the interface provided by the interactive platform 700 may include an application message header portion and an application message block portion. The application message header portion may include, for example, any one or a combination of a version identifier, a timestamp, a geographic identifier, a unit identifier (or UnitID), and a PEID. The UnitID may be used to identify a unique device of the interactive platform 700 to which the application message from the STB 702 is to be directed. The message block portion may include, for example, an EPSID and/or an application report block, which includes data relating to a specific event. For example, the application report block may include any one or a combination of: an EventID, a user message or input corresponding to the EventID, and a time duration corresponding to the EventID.

In a further embodiment of the present invention, business rules regarding a broadcast campaign (dynamic and/or interactive) may be incorporated as identifiers in an interactive/dynamic program of the campaign, such that the program is aired according to the rules. For example, the rules may be XML schema that specify that the interactive/dynamic program is to be aired whenever a particular show is broadcast, and also may specify one or more airing times during the show. Thus, when a broadcaster (e.g., media provider, media seller, cable system, satellite system, etc.) receives an indication that a viewer is viewing that particular show (e.g., by a VOD request, by a Web access, by a DVR request, by a cable station selection, by a satellite station selection, etc.), the interactive/dynamic program is automatically inserted or integrated with the airing of the show.

The systems and methods of the present invention (or any part(s) or function(s) thereof) may be implemented using hardware, software, or a combination thereof and may be implemented in one or more computer systems or other processing systems. Although some of the features or aspects of the present invention are described in terms that may be associated with mental operations performed by a human operator, no such capability of a human operator is necessary or is even desirable. Rather, such features are machine operations performed by machines such as computer processors or similar devices.

Figure 8:
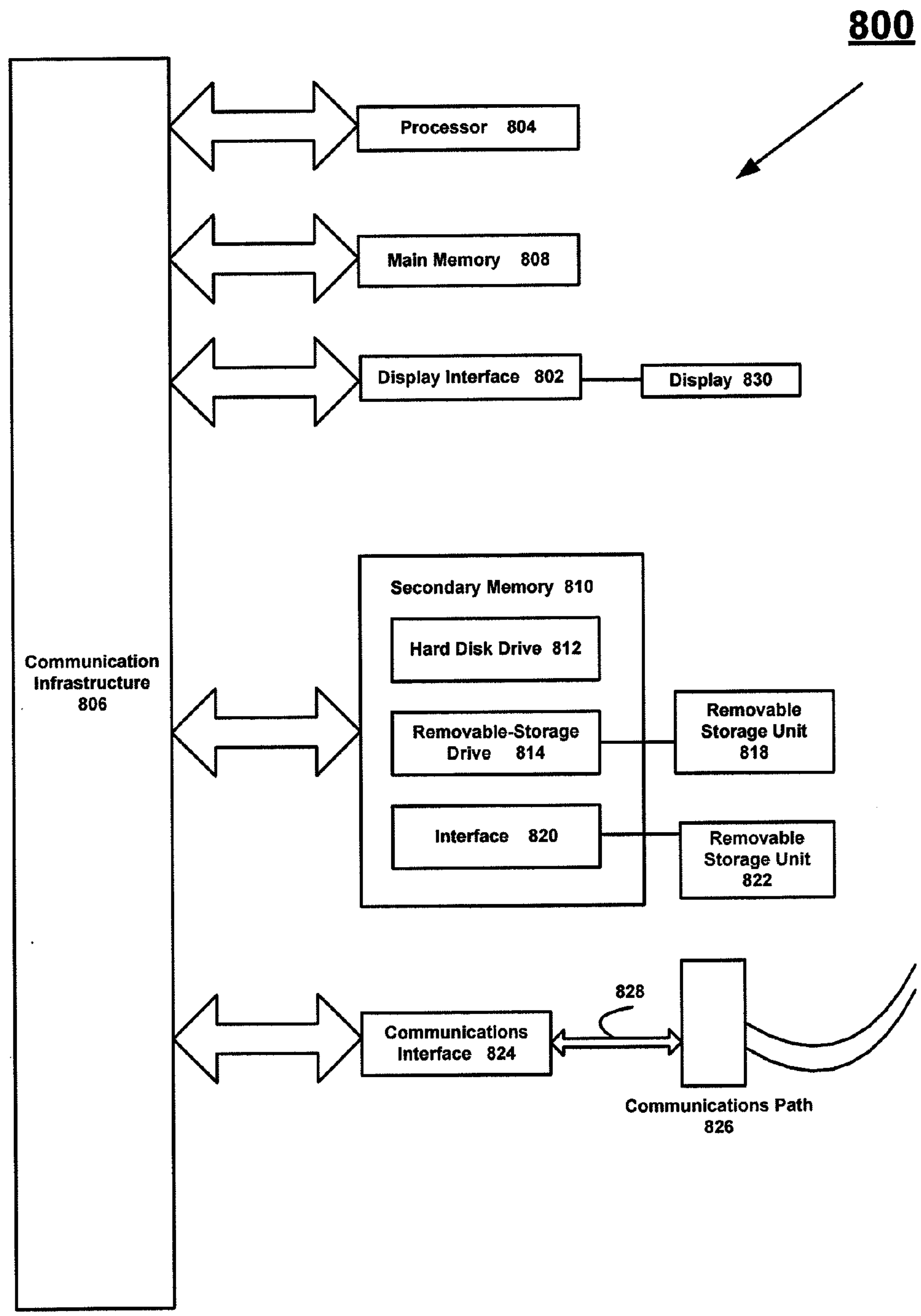
FIG. 8 is a block diagram showing an example of a computer system that may be used in implementing embodiments of the present invention.

More specifically, embodiments of the present invention may be implemented by one or more computer systems configured or programmed to carry out the functionality described herein. An example of such a computer system 800 is shown in FIG. 8. As will be appreciated by persons skilled in the art of computer operations, the computer system 800 may utilize programming modules (not shown) for implementing various features and functions described herein.

The computer system 800 may includes one or more processors, such as processor 804. The processor 804 is connected to a communication infrastructure 806 (e.g., a communications bus, cross-over bar, or network). Various software embodiments are described in terms of this computer system 800. However, after reading the descriptions provided herein, it will become apparent to a person skilled in the relevant art how to implement embodiments of the present invention using other computer systems and/or architectures.

The computer system 800 may include a display interface 802 that forwards graphics, text, and other data from the communication infrastructure 806 (or from a frame buffer not shown) for display on a display unit 830.

The computer system 800 also may include a main memory 808, preferably random access memory (RAM), and further may include a secondary memory 810. The secondary memory 810 may include, for example, a hard disk drive 812 and/or a removable storage drive 814, representing a floppy disk drive, a magnetic tape drive, an optical disk drive, a flash memory drive, etc. The removable storage drive 814 reads from and/or writes to a removable storage unit 818 in a well known manner. As will be appreciated, the removable storage unit 818 includes a computer-readable storage medium storing computer software (i.e., program code) and/or data.

In alternative embodiments, the secondary memory 810 may include other similar devices for allowing computer programs or other instructions to be loaded into the computer system 800. Such devices may include, for example, a removable storage unit 822 and an interface 820. Examples of such may include a program cartridge and a cartridge interface (such as that found in video game devices), a removable memory chip (such as an erasable programmable read only memory (EPROM) or a programmable read only memory (PROM)), and an associated socket, as well as other removable storage units 822 and other interfaces 820 that allow software and data to be transferred from the removable storage unit 822 to the computer system 800.

The computer system 800 also may include a communications interface 824, which allows software and data to be transferred between the computer system 800 and external devices. The communications interface N24 may be, for example, a modem, a network interface (such as an Ethernet card), a communications port, a Personal Computer Memory Card International Association (PCMCIA) slot and card, and the like. Software and data transferred via communications interface 824 are in the form of signals N28 which may be electronic, electromagnetic, optical, or other types of signals capable of being received by communications interface 824. These signals 828 are provided to the communications interface 824 via a communications path (e.g., a channel) 826. The path or channel 826 carries the signals 828 and may be implemented using an one or a combination of: wire and/or cable; fiber optics; a telephone line; a cellular link; a radio frequency (RF) link; and other types of communications channels or paths.

The term "computer-readable medium" and similar such terms as used herein are intended to refer generally to a tangible medium, such as the removable storage drive 814, a hard disk installed in hard disk drive 812, a flash-type memory unit, and the like.

The computer programs (also referred to herein as computer control logic and computer code) may be stored in the main memory 808 and/or the secondary memory 810. The computer programs also may be received via the communications interface 824. Such computer programs, when executed, enable the computer system 800 to perform the features and functions of various embodiments of the present invention, as discussed herein. In particular, the computer programs, when executed, enable the processor 804 to perform or implement the features and functions of various embodiments of the present invention. Accordingly, such computer programs may be considered to represent controllers of the computer system 800.

In an embodiment where the present invention is implemented using software, the software may be stored in a computer program product (e.g., a computer-readable storage medium) and loaded into the computer system 800 using removable storage drive 814, the hard drive 812, or the communications interface 824. The control logic (software), when executed by the processor 804, causes the processor 804 to implement various functions described herein.

In another embodiment, the present invention may be implemented primarily in hardware using, for example, hardware components such as application specific integrated circuits (ASICs). Implementation of such a hardware-based machine so as to implement various ones of the functions described herein will be apparent to persons skilled in the relevant arts and, as such, is not described in detail herein.

In yet another embodiment, the present invention may be implemented using a combination of both hardware and software.

While various embodiments of the present invention have been described above, it should be understood that they have been presented by way of example, and not limitation. It will be apparent to persons skilled in the relevant art(s) that various changes in form and detail can be made to the described embodiments without departing from the spirit and scope of the present invention. Thus, the present invention should not be limited by any of the above described exemplary embodiments, but should be defined only in accordance with the following claims and their equivalents.

In addition, it should be understood that the figures illustrated in the attached drawings, which show operations and functions of embodiments of the present invention, are presented schematically for example purposes only. The architectures of embodiments of the present invention are sufficiently flexible and configurable such that they may be utilized (and navigated) in ways other than those shown in the figures.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the specification. The Abstract is not intended to be limiting as to the scope of the present invention in any way.

Additionally, it is to be understood that the steps and processes recited in the claims need not be performed in the order presented.

What is claimed is:

1. An electronic communication system for facilitating coordination of interactive broadcast campaigns via a communication network, the system comprising:

a central processing unit configured to selectively execute one or more program modules;

an interface configured to transmit data from the central processing unit to the communication network, and to receive data from the communication network and provide the received data to the central processing unit; and a memory storing the plurality of program modules, the memory being accessible by the central processing unit, wherein the program modules include:

a coordination module configured to enable a media coordinator to coordinate interactive broadcast campaigns of media buyers with broadcasting capabilities of media sellers; and a seller interface module configured to provide a seller communication interface to media sellers, the seller communication interface enabling the media sellers to provide broadcasting information to the coordination module and to receive campaign information from the coordination module, wherein the coordination module includes:

a campaign planning submodule configured to provide an interface for receiving from a media seller at least one of: inventory information, footprint information, and audience information pertaining to the media seller;

a campaign delivery submodule configured to provide an interface for performing at least one of:

providing to one or more of the media sellers a campaign information package pertaining to an interactive broadcast campaign, and receiving performance information from the one or more of the media sellers regarding the interactive broadcast campaign;

a media-content delivery submodule configured to provide an interface for providing to the one or more of the media sellers media content for an interactive program corresponding to the interactive broadcast campaign, the media content including at least one of: content metadata and a content encoding profile;

an interactive applications support submodule configured to provide an interface for providing to the one or more of the media sellers processing information for the interactive program, the processing information including interactive response handling information used to enable viewer interaction with the interactive program;

an information services submodule configured to provide an interface for receiving from the one or more of the media sellers service measurement information regarding performance of the interactive broadcast campaign; and a viewer-response fulfillment submodule configured to provide an interface for receiving from the one or more of the media sellers results of viewer interactions with the interactive program, and wherein the interactive program is a broadcast in which viewers interact with prompts displayed during airing of the broadcast to make a selection that is used to determine an outcome of the broadcast.

2. An electronic communication system according to claim 1, wherein the content metadata is format data regarding at least one of: an entertainment content and an advertising content of the interactive program.

3. An electronic communication system according to claim 1, wherein the content encoding profile includes encoding information used to facilitate at least one of: ingestion, distribution, and presentation of the interactive program.

4. An electronic communication system according to claim 1, wherein the service measurement information includes information used for at least one of: campaign planning, campaign evaluation, and campaign billing.

5. An electronic communication system according to claim 1, wherein the results of the viewer interactions with the interactive program are aggregated according to predefined criteria.

6. An electronic communication system according to claim 5, wherein the predefined criteria include at least one of: a geographical region, a time range, a date range, a viewer-demographic category.

7. An electronic communication system according to claim 1, wherein the footprint information includes at least one of: one or more geographical regions served by the media seller, a number of households served by the media seller and having interactive service, and demographic information on the households served by the media seller and having interactive service.

8. An electronic communication system according to claim 1, wherein the audience information includes at least one of: one or more geographical regions of viewers served by the media seller, demographic information of the viewers served by the media seller, and psychographic information of the viewers served by the media seller.

9. An electronic communication system according to claim 1, wherein the inventory information includes at least one of: available advertisement spots during scheduled broadcast programs, available openings for broadcast programs, and pricing information.

10. An electronic communication system according to claim 1, wherein the campaign information package includes information used by the one or more of the media sellers to broadcast media contents of the interactive program campaign and to interpret viewer messages corresponding to interactions with an interactive program of the interactive program campaign.

11. An electronic communication system according to claim 10, wherein the campaign information package includes at least one of:

configuration information used for broadcasting the media contents of the interactive program campaign, delivery information used for delivering the media contents to a designated destination, identifiers for resolving measurement categories with the viewer messages corresponding to interactions with the interactive program, addresses for delivery of the viewer messages, and addresses for delivery of measurement data.

12. An electronic communication system according to claim 1, wherein the performance information includes status information on a current execution status of the interactive program campaign.

13. An electronic communication system according to claim 1, wherein the interactive broadcast campaigns include any one or a combination of:

a request-based interactive program campaign, which enables a viewer to interact with a display screen to request information regarding content displayed on the display screen, such that the information requested by the viewer is delivered to the viewer as an electronic document, or as a hardcopy document, or as both an electronic document and a hardcopy document, an on-demand interactive program campaign, which enables a viewer to interact with a display screen to view a content item selected via the display screen, such that a selection made by the viewer causes the selected content item to be displayed on the display screen, and a vote/poll-based interactive program campaign, which enables a viewer to interact with a display screen to cast a vote or to take a poll regarding content displayed on the display screen.

14. An electronic communication system according to claim 13, wherein the request-based interactive program campaign is an advertising campaign.

15. An electronic communication system according to claim 13, wherein the on-demand interactive program campaign is an advertising campaign.

16. An electronic communication system according to claim 13, wherein the display screen is a monitor of a television apparatus, and wherein a viewer interacts with the monitor via a remote controller.

17. An electronic communication system according to claim 13, wherein the seller interface module includes a viewer-response fulfillment submodule configured to provide an interface for receiving from a media seller results of viewer interactions with an interactive program.

18. An electronic communication system according to claim 17, the results of the viewer interactions include, for a request-based interactive program campaign, any one or a combination of:

a total number of requests for information, a regional distribution of the requests for information, and a distribution of the requests for information based on a psychographic characteristic.

19. An electronic communication system according to claim 17, the results of the viewer interactions include, for an on-demand interactive program campaign, any one or a combination of:

a total number of requests to view a program, a distribution of durations that a program is viewed, a distribution of times when requests to view a program are made, a distribution of ad selections made by viewers with respect to a plurality of programs offered for selection, a distribution of telescoping selections made by viewers in response to a telescoping program, a regional distribution of a selected program, and a distribution of a selected program based on psychographic subscriber characteristics.

20. An electronic communication system according to claim 19, wherein, for an on-demand interactive program campaign, the display screen displays a short-form interactive program having an interactive function that enables a viewer to select to view a corresponding long-form program.

21. An electronic communication system according to claim 19, wherein a telescoping program is an interactive program that allows a viewer to sequentially select to view topics and subtopics relating to subject matter of the telescoping program.

22. An electronic communication system according to claim 17, the results of the viewer interactions include, for a vote/poll-based interactive program campaign, any one or a combination of:

a distribution of votes or polls made by viewers with respect to a plurality of items offered for voting or polling, a regional distribution of votes or polls made by viewers with respect to a plurality of items offered for voting or polling, and a distribution votes or polls based on psychographic subscriber characteristics.

23. An electronic communication system according to claim 1, wherein the seller interface module includes any one or a combination of:

a campaign manager submodule configured to provide an interface for performing at least one of:

providing footprint information to the coordination module, providing inventory information to the coordination module, providing audience information to the coordination module, providing to the coordination module performance information regarding an interactive broadcast campaign, receiving from the coordination module a campaign information package pertaining to an interactive broadcast campaign, and receiving from the coordination module processing information for an interactive program, the processing information interactive response handling information used to enable viewer interaction with the interactive program;

an asset manager submodule configured to provide an interface for performing at least one of:

receiving from the coordination module content metadata, the content metadata including format data regarding contents of an interactive program, and receiving from the coordination module a content encoding profile, the content encoding profile including encoding information used to facilitate at least one of: ingestion, distribution, and presentation of an interactive program;

a service measurement submodule configured to provide an interface for providing to the coordination module measurement information regarding performance of an interactive broadcast campaign; and a viewer response submodule configured to provide an interface for providing to the coordination module results of viewer interactions with an interactive program.

24. An electronic communication system according to claim 23, wherein the service measurement information includes information used for at least one of: campaign planning, campaign evaluation, and campaign billing.

25. An electronic communication system according to claim 23, wherein the results of the viewer interactions with the interactive program are aggregated according to predefined criteria.

26. An electronic communication system according to claim 25, wherein the predefined criteria include at least one of: a geographical region, a time range, a date range, a viewer-demographic category.

27. An electronic communication system according to claim 23, wherein the footprint information includes at least one of: one or more geographical regions served by the media seller, a number of households served by the media seller and having interactive service, and demographic information on the households served by the media seller and having interactive service.

28. An electronic communication system according to claim 23, wherein the audience information includes at least one of: one or more geographical regions of viewers served by the media seller, demographic information of the viewers served by the media seller, and psychographic information of the viewers served by the media seller.

29. An electronic communication system according to claim 23, wherein the inventory information includes at least one of: available advertisement spots during scheduled broadcast programs, available openings for broadcast programs, and pricing information.

30. An electronic communication system according to claim 23, wherein the campaign information package includes information used to broadcast media content of the interactive program campaign and to interpret viewer messages corresponding to interactions with an interactive program of the interactive program campaign.

31. An electronic communication system according to claim 30, wherein the campaign information package includes at least one of:

configuration information used for broadcasting the media content of the interactive program campaign, delivery information used for delivering the media content to a designated destination, identifiers for resolving measurement categories with the viewer messages corresponding to interactions with the interactive program, addresses for delivery of the viewer messages, and addresses for delivery of measurement data.

32. An electronic communication system according to claim 23, wherein the performance information includes status information on a current execution status of the interactive program campaign.

33. An electronic communication system according to claim 23, wherein the processing information enables a media seller to selectively broadcast different versions of an ad to different groups of subscribers, the different groups of subscribers having different psychographic characteristics.

34. An electronic communication system according to claim 23, wherein the processing information enables a media seller to selectively broadcast different versions of an ad to different geographical regions.

35. An electronic communication system according to claim 1, further comprising a buyer interface module configured to provide a buyer communication interface to media buyers, the buyer communication interface enabling the media buyers to provide information to and receive information from the coordination module.

36. An electronic communication system according to claim 35, wherein the information received by the buyer communication interface from the coordination module includes at least one of:

information for a production toolkit used to produce an interactive program suitable for broadcasting by one or more of the media sellers as part of an interactive program campaign, and information for a stream generator used to incorporate interactive features into a live program to produce a live interactive program, the live interactive program being suitable for live broadcasting by one or more of the media sellers as part of an interactive program campaign.

37. An electronic communication system according to claim 36, wherein the information for the production toolkit includes at least one:

application development information used to provide an application programming interface for enabling interactive functions to be incorporated in an interactive program, and content distribution format information used to transfer application resources from the coordination module to the stream generator.

38. An electronic communication system according to claim 37, wherein the application programming interface includes a set of customizable application templates for enabling a media buyer to customize a predefined set of interactive functions.

39. An electronic communication system according to claim 37, wherein the application resources include any one or a combination of:

configuration metadata for signaling pertaining to the stream generator, configuration metadata for timing parameters pertaining to the stream generator, ETV formatted files, and OCAP formatted files.

40. An electronic communication system according to claim 37, wherein the stream generator embeds the application resources in a stream of media content to be broadcast live.

41. An electronic communication system according to claim 36, wherein the production toolkit outputs fulfillment information to the coordination module, the fulfillment information including runtime data pertaining to interactive features of an interactive program displayed during broadcasting of the interactive program.

42. An electronic communication system according to claim 35, wherein the buyer interface module is configured to provide a plurality of buyer communication interfaces to the media buyer, the plurality of buyer communication interfaces including any one or a combination of:

a campaign research submodule configured to provide an interface for providing research information to a media buyer;

a request submodule configured provide an interface for receiving a proposal request for an interactive broadcast campaign;

a proposal submodule configured to provide an interface for providing a campaign proposal to a media buyer;

an order submodule configured to provide an interface for receiving from a media buyer an order for an interactive broadcast campaign, based on a campaign proposal;

an invoice submodule configured to provide an interface for providing a media buyer with an invoice for a completed order;

application development submodule configured to provide to a media buyer an application programming interface for enabling interactive functions to be incorporated in an interactive program;

content distribution format submodule configured to perform at least one of:

provide an interface for providing to a media buyer information used to transfer application resources from the coordination module to a stream generator, and provide an interface for receiving from a media buyer media contents to be broadcast by a media seller;

a service report submodule configured to provide an interface for providing a service report to a media buyer, the service report pertaining to a status of an interactive broadcast campaign; and a viewer response submodule configured to provide an interface for providing a viewer-response report to a media buyer, the viewer-response report pertaining to results of viewer interactions with an interactive program of the interactive broadcast campaign.

43. An electronic communication system for facilitating coordination of broadcast campaigns via a communication network, the system comprising:

a central processing unit configured to selectively execute one or more program modules;

an interface configured to transmit data from the central processing unit to the communication network, and to receive data from the communication network and provide the received data to the central processing unit; and a memory storing the plurality of program modules, the memory being accessible by the central processing unit, wherein the program modules include:

a coordination module configured to enable a media coordinator to coordinate broadcast campaigns of media buyers with broadcasting capabilities of media sellers; and a seller interface module configured to provide a seller communication interface to media sellers, the seller communication interface enabling the media sellers to provide broadcasting information to the coordination module and to receive campaign information from the coordination module, wherein the coordination module includes:

a campaign planning submodule configured to provide an interface for receiving from a media seller at least one of: inventory information, footprint information, and audience information pertaining to the media seller;

a campaign delivery submodule configured to provide an interface for performing at least one of:

providing to one or more of the media sellers a campaign information package pertaining to a dynamic broadcast campaign, and receiving performance information from the one or more of the media sellers regarding the dynamic broadcast campaign;

a media-content delivery submodule configured to provide an interface for providing to the one or more of the media sellers media content for programs corresponding to the dynamic broadcast campaign, the media content including at least one of: content metadata and a content encoding profile;

an applications support submodule configured to provide an interface for providing to the one or more of the media sellers processing information for the programs; and an information services submodule configured to provide an interface for receiving from the one or more of the media sellers service measurement information regarding performance of the dynamic broadcast campaign, wherein the dynamic broadcast campaign is updatable during execution thereof, and wherein the programs include a broadcast in which viewers interact with prompts displayed during airing of the broadcast to make a selection that is used to determine an outcome of the broadcast.

44. An electronic communication system according to claim 43, wherein the dynamic broadcast campaign is updatable during execution thereof to cause a second of the programs to be broadcast by the one or more of the media sellers instead of a first of the programs.

45. An electronic communication system according to claim 43, wherein the dynamic broadcast campaign is updatable during execution thereof in response to the service measurement information regarding the performance of the dynamic broadcast campaign.

46. An electronic communication system according to claim 45, wherein the service measurement information regarding the performance of the dynamic broadcast campaign is at least one of: viewer interaction information and viewership demographics information.

* * * * *

UNITED STATES PATENT AND TRADEMARK OFFICE

CERTIFICATE OF CORRECTION

PATENT NO. : 9,137,557 B1
APPLICATION NO. : 12/533431
DATED : September 15, 2015
INVENTOR(S) : Francis R. Sandoval It is certified that error appears in the above-identified patent and that said Letters Patent is hereby corrected as shown below:

In The Specification

COLUMN 10

Line 46, “provide” should read --to provide--.

COLUMN 14

Line 42, “bution” should read --bution of--.

COLUMN 18

Line 41, “an” should be deleted.

COLUMN 22

Line 47, “distribution” should read --distribution of--.

COLUMN 25

Line 14, “provide” should read --to provide--.

Signed and Sealed this
Twenty-third Day of February, 2016

*Michelle K. Lee*

Michelle K. Lee
*Director of the United States Patent and Trademark Office*